Patented Sept. 20, 1938

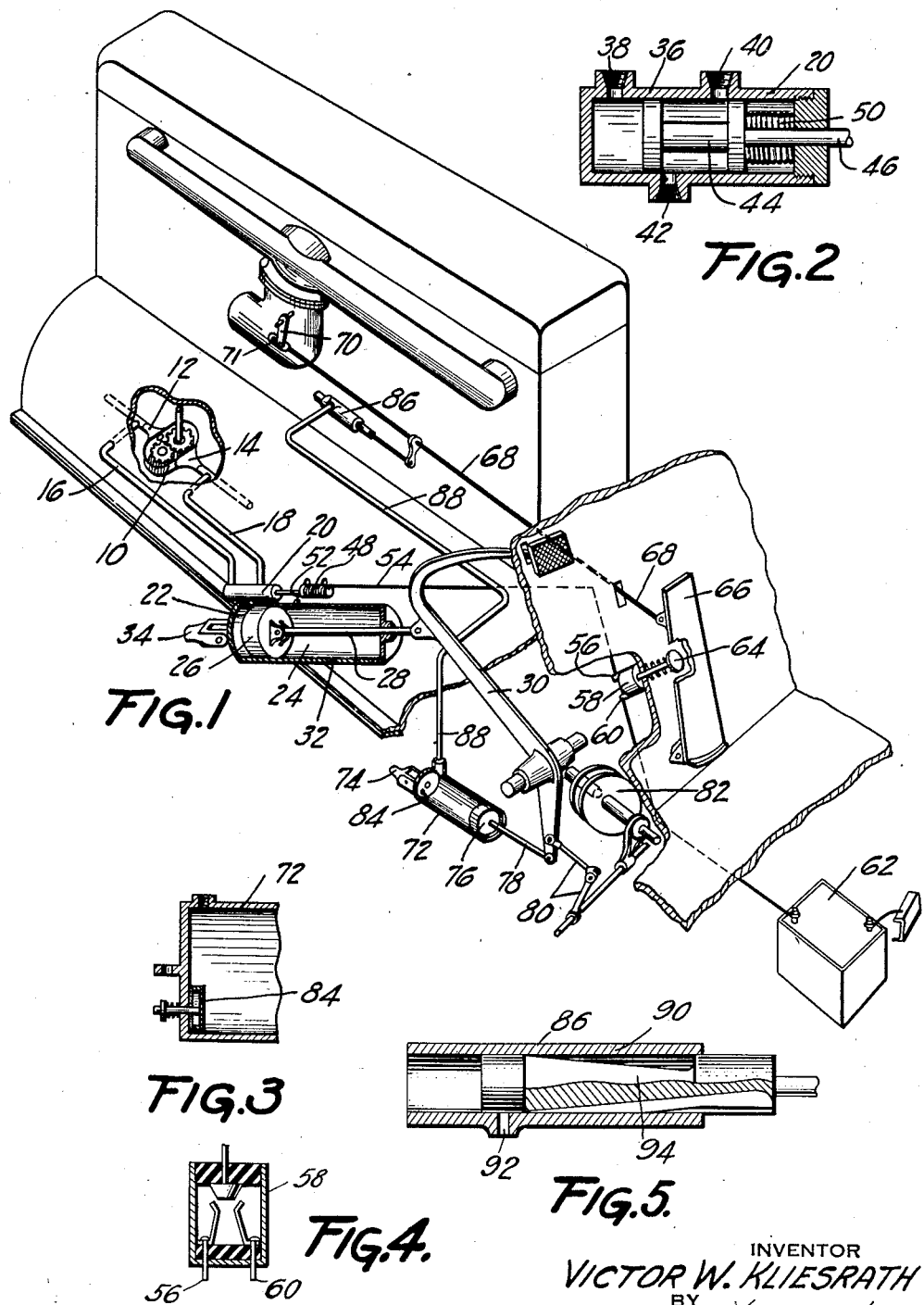

2,130,848

UNITED STATES PATENT OFFICE 2,130,848

CLUTCH CONTROL

Victor W. Kliesrath, South Bend, Ind., assignor to Bendix Aviation Corporation, South Bend, Ind., a corporation of Delaware Original application November 30, 1932, Serial No. 645,103. Divided and this application April 17, 1937, Serial No. 137,417

2 Claims. (Cl. 192—.01)

This invention relates in general to the throttle and clutch mechanism of an automotive vehicle, and in particular to means for facilitating the operation of such controls to the end that both a minimum of skill and physical effort is necessary in the operation of said controls.

To the above end the engine contemplates the provision of power means for operating the clutch, said power means utilizing the internal-combustion engine of the vehicle as a prime mover and comprising an engine operated hydraulic motor. In one preferred embodiment of the invention, the power means comprises a fluid pump drivably connected to the engine crank shaft and operative to energize a so-called power actuator, the latter being operably connected to the clutch mechanism of the automotive vehicle. In one arrangement, the throttle operating accelerator pedal is also operative to actuate a switch, the latter controlling a solenoid operated control valve for the actuator, such that with complete release of the accelerator the suction side of the aforementioned fluid pump is placed in circuit with the actuator to energize the same and effect a disengagement of the clutch, and with depression of the accelerator the control valve is operated to place the pressure side of the fluid pump in circuit with the actuator to again energize the same to engage the clutch.

Yet another object of the invention is to provide means, operable in conjunction with said power means, for controlling the engagement of the clutch to accurately simulate the corresponding manual control of the clutch.

Other objects of the invention and desirable details of construction and combinations of parts will become apparent from the following description of a preferred embodiment, which description is taken in conjunction with the accompanying drawing, in which:

Figure 1 is a diagrammatic view, in perspective, of one form of clutch operating power means constituting my invention;

Figure 2 is a sectional view, on an enlarged scale, of the solenoid operated three-way valve mechanism shown in Figure 1;

Figure 3 is a sectional view, on an enlarged scale, of a portion of the dashpot shown in Figure 1, and Figures 4 and 5 are sectional views disclosing, in detail, the switch beneath the accelerator and the bleed valve respectively.

Describing in detail the construction of the power means constituting the invention, there is provided an oil pump 10, which may also serve as the pump of the force feed lubricating system of the engine. The discharge and intake sides 12 and 14 of the pump 10 are connected respectively by conduits 16 and 18 with a control valve 20, the latter being connected by a conduit 22 with the fluid receiving end of a clutch operating actuator or fluid motor 24. A reciprocable piston or power element 26 of the fluid motor is connected by means of a rod 28 with a conventional clutch pedal 30. A cylinder or body portion 32 of the motor is preferably pivotally secured by a connection 34 with a portion of the chassis, not shown. The control valve 20 comprises a cylinder 36 having ports 38, 40 and 42, and further comprises a reciprocable spool-shaped piston member 44 operably connected by a rod 46 with a solenoid 48, the latter being preferably mounted on the actuator cylinder 24. A spring 50 is interposed between one end of the valve cylinder and one end of the valve piston. The solenoid 48 is of conventional design and is provided with leads 52 and 54, the former being connected to the cylinder 32 to provide a ground and the latter being connected to one contact 56 of a switch 58, the remaining contact 60 being connected to a source of current such as a battery 62. The switch further comprises a spring operated plunger 64, positioned immediately beneath an accelerator 66, the latter connected by a rod 68 with a conventional carburetor operating lever 70. The connection between the rod 68 and lever 70 provides for a certain amount of lost motion at 71 in order that the switch may be operated before and after the opening and closing of the throttle, respectively. The switch 58 is thus operative to control the operation of the clutch motor 24 during the final and initial increments of movement of the accelerator pedal.

The construction of the clutch operating power means is completed by a dashpot cylinder 72 secured to the chassis by a bracket 74, a reciprocable piston 76 of the dashpot being connected by a rod 78 with the clutch pedal 30, the latter being connected by linkage 80 with conventional friction elements of a clutch 82. The influx of air to the dashpot during the disengagement of the clutch is permitted by a check valve 84, and the efflux of air therefrom is regulated, to control the mode of clutch engaging movement of the clutch pedal, by means of an accelerator operated bleed valve 86 in fluid transmitting connection with the dashpot cylinder 72 by means of a conduit 88. The valve 86, which is disclosed in detail in Figure 5, includes a casing 90 ported at 92 to register with a tapered plunger 94.

In operation, with the accelerator released and the engine idling the switch 58 is arranged to be closed by its spring to thereby energize the solenoid 48. The valve piston 44 is accordingly moved to the right, to the position disclosed in Figure 2, to intercommunicate the suction side of pump 10 with the clutch operating fluid motor and effect an evacuation of the liquid from the motor to disengage the clutch. With the operation of the accelerator to increase the engine speed the switch plunger 64 is depressed to open the switch, thus deenergizing the solenoid and permitting the valve spring 50 to move the valve member 44 to the left to intercommunicate the pressure side of the pump with the motor and positively engage the clutch. The rate of clutch engaging movement of the clutch pedal, under the action of the power fluid, is determined by the rate of efflux of air from the dashpot 72, said rate, in turn, being determined by the degree of opening of the bleed valve 86 by the accelerator.

There is thus provided an accelerator controlled hydraulically operated power means for both positively disengaging and engaging the clutch, the initiating of the clutch disengaging and engaging operations of the power means being effected by the operation of valve means controlled by the accelerator and the rate of engagement of the clutch being a function of the amount of depression of the accelerator through the medium of the bleed valve.

The invention heretofore described is disclosed in my copending application Serial No. 645,103, filed November 30, 1932, now issued as Patent No. 2,086,560, this application constituting a division thereof.

While one illustrative embodiment has been described, it is not my intention to limit the scope of the invention to that particular embodiment, or otherwise than by the terms of the appended claims.

I claim:

1. In an automotive vehicle provided with an accelerator and further provided with a clutch mechanism, power means for operating the clutch comprising a fluid pump having discharge and intake conduits, said power means further comprising a single-ended power actuator operably connected to the clutch and adapted to be energized by said fluid pump, an electrically operated accelerator controlled control valve for said actuator, and connections interconnecting said actuator, valve and discharge and intake conduits of said pump, said parts being so constructed and arranged that in one operative position of the valve the intake side of the pump is placed in circuit with the actuator to energize the same and disengage the clutch and in another position of the valve the discharge side of the pump is placed in circuit with the actuator to energize the same and positively engage the clutch.

2. In an automotive vehicle provided with an accelerator and a clutch, power means for operating the clutch comprising a power actuator, the power or movable element of which is operably connected to the clutch, a hydraulic pump, a fluid transmitting connection interconnecting the discharge side of said pump with one end of said actuator, another fluid transmitting connection interconnecting the intake side of said pump with the aforementioned end of the actuator, and a control valve for said actuator interposed in the connections between the discharge and intake sides of the pump and the actuator and operative, in one of its controlling positions, to intercommunicate the intake side of the hydraulic pump with the actuator to energize the same and effect a disengagement of the clutch, said valve being operative in its remaining controlling position to intercommunicate the discharge side of the pump with the actuator to energize the same and effect an engagement of the clutch, the operation of said control valve being controlled by said accelerator, and means, extraneous to said power means and also controlled by the accelerator, for controlling the clutch engaging operation of the actuator.

VICTOR W. KLIESRATH.